No. 854,306. PATENTED MAY 21, 1907.
J. J. OWENS.
WHIFFLETREE ATTACHMENT.
APPLICATION FILED DEC. 19, 1906.

Witnesses

Inventor
J. J. Owens
By W. J. FitzGerald & Co.
Attorneys

UNITED STATES PATENT OFFICE.

JOHN J. OWENS, OF RANDOLPH, WISCONSIN.

WHIFFLETREE ATTACHMENT.

No. 854,306.  Specification of Letters Patent.  Patented May 21, 1907.

Application filed December 19, 1906. Serial No. 348,661.

*To all whom it may concern:*

Be it known that I, JOHN J. OWENS, a citizen of the United States, residing at Randolph, in the county of Dodge and State of Wisconsin, have invented certain new and useful Improvements in Whiffletree Attachments; and I do hereby declare the following to be a full, clear, and exact description of the invention, such as will enable others skilled in the art to which it appertains to make and use the same.

My invention relates to new and useful attachments for whiffle trees and my object is to provide means for yieldingly mounting the swingle tree in its bearings upon the cross bar or double tree.

A further object is to provide means for compensating for the swinging motion of the swingle tree caused by the draft animals.

Other objects and advantages will be hereinafter referred to and more particularly pointed out in the claims.

Figure 1:
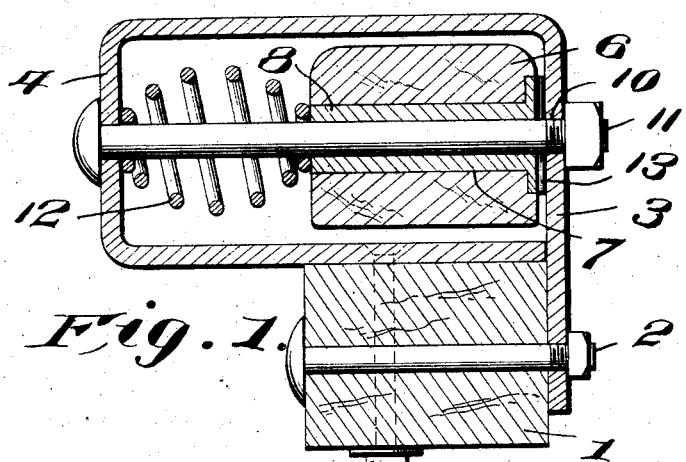
Figure 3:
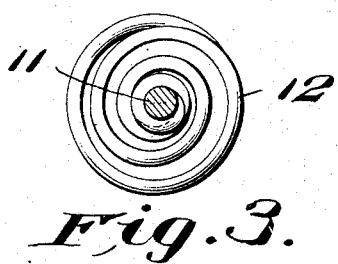
Figure 2:
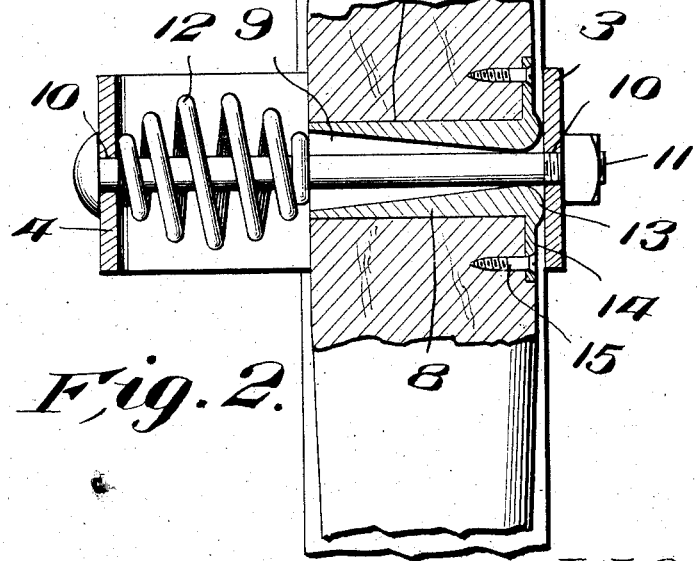

In the accompanying drawings which are made a part of this application, Figure 1 is a sectional view through the double tree and showing my improved attachment screwed thereto and holding the swingle tree in place thereon. Fig. 2 is a top plan view of the whiffle tree and double tree showing my improved attachment thereon and partly in section, and Fig. 3 is an end elevation of the tension spring employed in connection with my improved attachment showing the bolt passing therethrough in section.

Referring to the drawings in which similar reference numerals designate corresponding parts throughout the several views 1 indicates the usual form of cross bar or double tree to one edge of which is secured, by means of a bolt 2, a strap 3, the upper end of said strap being bent to form a bracket or housing 4 which is so formed that that portion of the strap forming the lower section of the bracket will rest upon the upper face of the double tree and is secured thereto by means of bolts or the like 5.

Extending longitudinally with the double tree 1 and through the bracket 4 is a swingle tree 6 through the central portion of which is disposed an opening 7 and directed through said opening is a socket 8.

Extending through a bore 9 in the socket 8 and through registering bores 10 in the end walls of the bracket 4 is a retaining bolt 11 by which means the swingle tree is held in position within the bracket the bolt and bracket being longer than the width of the swingle tree so that said swingle tree may move forwardly in the bracket.

Disposed around the bolt 11 and between the forward end of the bracket 4 and the swingle tree is a coiled spring 12 each end of which is reduced in size to snugly fit around the bolt 11 so that the coils of said spring will be held a uniform distance around the bolt at all times and at the same time preventing the spring from rattling upon the bolt. By this construction it will be seen that any sudden jar incident to the checking or stoppage of the vehicle will be removed from the draft animals and it will also be seen that should the draft animal give a sudden start the occupant of the vehicle will not be effected thereby as the spring will yield sufficiently to counteract the sudden pull upon the swingle tree.

The movement of the draft animal naturally causes the swingle tree to swing from its central point and to permit of this movement the bore 9 is enlarged laterally from a point adjacent its rear end to its forward end and the rear end of the socket is provided at each side of the bolt 11 with vertically disposed ribs 13 said ribs being semi-circular in cross section so that when the same are into engagement with the rear end of the bracket 4 the swinging movement of the swingle tree will not be retarded.

To further secure the socket 8 to the swingle tree I have provided a head 14 at the rear end of the socket which is adapted to be counter sunk into the swingle tree and fastened therein by means of screws or the like 15 which are entered through openings in the head and into the swingle tree.

It will now be seen that I have provided a cheap and durable means for securing the swingle tree to the double tree and at the same time provided a yielding bearing for the swingle tree so that a sudden forward movement of the draft animals will not materially effect or jerk the occupant of the vehicle and it will further be seen that I have provided means for allowing a swinging movement of the swingle tree to compensate for the action of the movement of the draft animal upon the swingle tree.

What I claim is:—

The combination with a double tree, of a bracket, a swingle tree disposed through said bracket, a socket through said swingle tree said socket having a flared bore therethrough, ribs at the rear end of said socket, a bolt extending longitudinally through said bracket and bore and a coiled spring surrounding said bolt between the swingle tree and end of the bracket the free ends of said spring being reduced to fit the bolt.

In testimony whereof I have signed my name to this specification in the presence of two subscribing witnesses.

JOHN J. OWENS.

Witnesses:
 DAVID DAVIS,
 DAVID G. JONES.